United States Patent
Shin

(10) Patent No.: US 7,602,469 B2
(45) Date of Patent: Oct. 13, 2009

(54) COOLING APPARATUS AND METHOD FOR MANUFACTURING LIQUID CRYSTAL DISPLAY DEVICE USING THE SAME

(75) Inventor: Jae Ho Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 403 days.

(21) Appl. No.: 11/477,817

(22) Filed: Jun. 30, 2006

(65) Prior Publication Data
US 2007/0151664 A1 Jul. 5, 2007

(30) Foreign Application Priority Data
Dec. 29, 2005 (KR) .................. 10-2005-0133124

(51) Int. Cl.
*G02F 1/1339* (2006.01)
(52) U.S. Cl. ........................... 349/190; 349/153
(58) Field of Classification Search ............ 349/153, 349/189, 190
See application file for complete search history.

(56) References Cited

U.S. PATENT DOCUMENTS

| | | | | |
|---|---|---|---|---|
| 6,459,467 | B1 * | 10/2002 | Hashimoto et al. | 349/153 |
| 7,450,213 | B2 * | 11/2008 | Kim et al. | 349/187 |
| 7,486,375 | B2 * | 2/2009 | Lee et al. | 349/190 |

* cited by examiner

*Primary Examiner*—Uyen Chau N Le
*Assistant Examiner*—John M Bedtelyon
(74) *Attorney, Agent, or Firm*—McKenna Long & Aldridge LLP

(57) ABSTRACT

A method for manufacturing a liquid crystal display device includes preparing a lower substrate and an upper substrate; depositing a sealant on one of the two substrates; dropping a liquid crystal on one of the two substrates; bonding the two substrates to each other; bonding the two substrates to each other by hardening the sealant; and thermal quenching the two bonded substrates. Since thermal quenching of the two bonded substrates is additionally performed after hardening of the sealant is performed using a liquid crystal dropping method, orientation of a liquid crystal layer, which is scattered by the hardening of the sealant, is returned to its original state, thus preventing domain defects.

8 Claims, 3 Drawing Sheets

COOLING APPARATUS AND METHOD FOR MANUFACTURING LIQUID CRYSTAL DISPLAY DEVICE USING THE SAME

This application claims the benefit of Korean Patent Application No. P 2005-0133124, filed Dec. 29, 2005, which is hereby incorporated by reference for all purposes as if fully set forth herein. This application incorporates by reference co-pending application, Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and application, Ser. No. 11/476,919, now U.S. Pat. No. 7,450,213, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a liquid crystal display (LCD) device, and more particularly, to a method for manufacturing a liquid crystal display device using a liquid crystal drop method.

2. Discussion of the Related Art

A liquid crystal display device, among other ultra-thin flat panel display devices with a display screen having a thickness of several tens of cm, has a low operating voltage and low power consumption, and thus is ideally suited for portable applications, including in computers, as monitors, and military and aerospace applications.

Hereinafter, with reference to the accompanying drawings, a related art liquid crystal display device will be described.

As illustrated in FIG. 1, the related art liquid crystal display device comprises a lower substrate I and an upper substrate 3, which are opposite to each other. Although not illustrated in the drawings, TFTs and pixel electrodes are formed on the lower substrate 1, and a light shielding film, color filter layers, and common electrodes are formed on the upper substrate 3.

A liquid crystal layer 5 is formed between the lower substrate I and the upper substrate 3. The liquid crystal layer 5 is oriented in a designated direction by an orientation film (not shown) formed on the lower surface thereof.

A sealant layer 7 is formed between the lower substrate I and the upper substrate 3. The sealant layer 7 serves to seal the liquid crystal layer 5 and to bond the lower substrate 1 and the upper substrate 3 to each other.

The liquid crystal display device having the above structure is manufactured by a liquid crystal injection method or a liquid crystal drop method.

In the liquid crystal injection method, a lower substrate and an upper substrate are prepared, a sealant is deposited on one of the two substrates so that a sealant layer having an injection port is formed on the substrate, the substrates are bonded to each other and are bonded to by hardening the sealant layer, and liquid crystal is injected into a space between the bonded substrates through the injection port.

In the liquid crystal drop method, a lower substrate and an upper substrate are prepared, a sealant is deposited on the lower substrate so that a sealant layer without an injection port is formed on the lower substrate, liquid crystal is dropped on the lower substrate, and the two substrates are bonded to each other by hardening the sealant layer.

The liquid crystal injection method requires a long time to inject the liquid crystal, thus reducing productivity as substrate sizes increase. Accordingly, large-sized substrates use the liquid crystal drop method.

However, because the sealant layer is hardened under the condition that the liquid crystal layer is formed between the lower and upper substrates, the liquid crystal drop method causes domain defects due to a scattering of the orientation of the liquid crystal layer from high temperatures during hardening the sealant layer.

That is, in the liquid injection method, since the liquid crystal is injected into a space between the lower and upper substrates after the sealant layer is hardened, the liquid crystal layer is not exposed to high temperatures generated during hardening the sealant layer. However, in the liquid drop method, since the sealant layer is hardened after the liquid crystal layer is formed between the lower and upper substrates, the liquid crystal layer is exposed to high temperatures generated during hardening the sealant layer, and thus the orientation of the liquid crystal layer is scattered.

SUMMARY OF THE INVENTION

Accordingly, the present invention is directed to a cooling apparatus and a method for manufacturing a liquid crystal display device using the same.

A first object of the present invention is to provide a method for manufacturing a liquid crystal display device, which prevents orientation of a liquid crystal layer from being scattered when a sealant is hardened using a liquid crystal drop method.

A second object of the present invention is to provide an apparatus for manufacturing a liquid crystal display device, which prevents orientation of a liquid crystal layer from being scattered when a sealant is hardened using the liquid crystal drop method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing a liquid crystal display device includes preparing a lower substrate and an upper substrate; depositing a sealant on one of the two substrates; dropping a liquid crystal on one of the two substrates; bonding the two substrates to each other; bonding the two substrates to each other by hardening the sealant; and thermally quenching the two bonded substrates.

Since the thermal quenching of the two bonded substrates is performed after the hardening of the sealant in a liquid crystal drop method, orientation of a liquid crystal layer, which is scattered by the hardening of the sealant, is returned to its original state.

That is, the orientation of the liquid crystal layer, which is scattered due to heat of a high temperature, is returned to its original state by thermal quenching the liquid crystal layer.

Preferably, in the thermal quenching of the two bonded substrates, the temperature of the two bonded substrates is lowered to less than a $T_{NI}$ (Nematic Isotropic Transition Temperature) of the liquid crystal within 30 seconds.

Here, the $T_{NI}$ of the liquid crystal refers to a clearing point of the liquid crystal, i.e., a temperature at which the transition of the liquid crystal from the mesophase, between the liquid phase and the solid phase, to the liquid phase occurs so that the liquid crystal becomes transparent. Accordingly, the two bonded substrates are cooled to a temperature of less than the $T_{NI}$ of the liquid crystal at which the transition of the liquid crystal from the mesophase, between the liquid phase and the solid phase, to the liquid phase occurs, within 30 seconds, thereby returning the scattered orientation of the liquid crystal layer to its original state.

The $T_{NI}$ of a liquid crystal, which is generally applied to the liquid crystal display device, is in the range of 60~90° C.

A cooling apparatus having a condition for performing the thermal quenching of the two bonded substrates is used.

After the hardening of the sealant is completed, the bonded substrates reach a temperature of approximately 120° C., and while the bonded substrates are transferred to the cooling apparatus, the bonded substrates reach a temperature of approximately 110° C. and are put into the cooling apparatus.

Accordingly, in order to lower the temperature of the liquid crystal from approximately 110° C. to the $T_{NI}$ (approximately 60~90° C.) within 30 seconds, the temperature in the cooling apparatus is quickly lowered to −2° C.~−5° C.

In order to quickly lower the temperature in the cooling apparatus to −2° C.~−5° C., cold air of a temperature of less than −10° C. is supplied to the cooling apparatus.

The method may further comprise removing dew generated in the cooling apparatus when the two bonded substrates are thermally quenched under the above condition of the cooling apparatus.

When the temperature in the cooling apparatus is quickly lowered to −2° C.~−5° C., dew is formed in the cooling apparatus due to a difference of temperatures between the inside and the outside of the cooling apparatus.

Accordingly, the method may further comprise removing dew generated in the cooling apparatus. In the removing of the dew, heat is applied locally to parts of the cooling apparatus in which the dew is formed. Further, the local application of the heat is performed using hot wires installed in the parts of the cooling apparatus in which the dew is formed.

As an experimental result, dew is formed in a substrate inlet, a substrate outlet, and checking doors of the cooling apparatus. Accordingly, the hot wires are installed in the substrate inlet, the substrate outlet, and the checking doors of the cooling apparatus, thus preventing formation of dew in the cooling apparatus during the thermal quenching of the two bonded substrates.

In another aspect of the present invention, a cooling apparatus of bonded substrates includes a substrate stage for mounting the bonded substrates thereon; cooling coils for producing cold air; and a fan for circulating the cold air, wherein hot wires are installed in parts of the cooling apparatus in which dew is formed.

The hot wires are installed in the substrate inlet, the substrate outlet, and the checking doors of the cooling apparatus. The checking doors are at least one selected from the group consisting of a cooling coil checking door, fan checking doors, and substrate stage checking doors.

The cooling apparatus may further comprise an air filter for removing foreign substances from the cold air. In this case, a hot wire is installed in an air filter checking door.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 1:
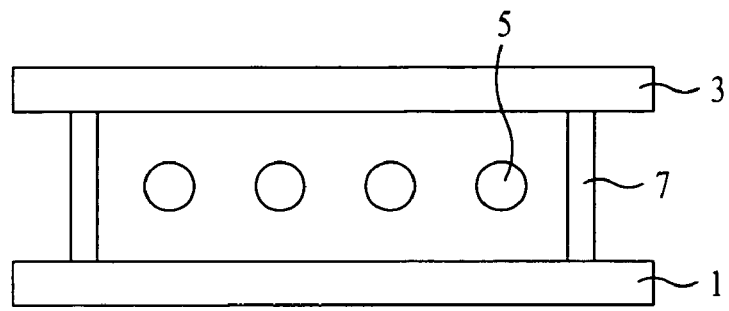
FIG. 1 is a schematic sectional view of a related art liquid crystal display device.
Figure 2:
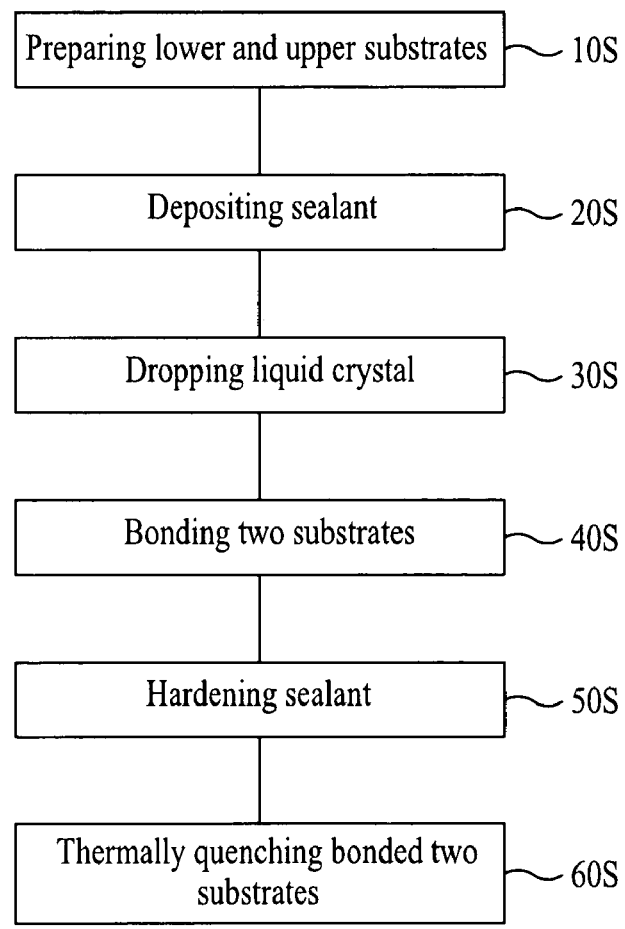
FIG. 2 is a flow chart illustrating a process for manufacturing a liquid crystal display device in accordance with an embodiment of the present invention.

FIG. 2 is a flow chart illustrating a process for manufacturing a liquid crystal display device in accordance with an embodiment of the present invention.

First, as illustrated in FIG. 2, a lower substrate and an upper substrate are prepared (10S).

The lower substrate and the upper substrate are appropriately changed according to the driving mode of a liquid crystal display device.

That is, when the liquid crystal display device is driven in a Twisted Nematic (TN) mode, gate lines and data lines, which perpendicularly intersect with each other, for defining pixel regions, TFTs formed at the intersections of the gate lines and the data lines and serving as switching elements, and pixel electrodes formed in the pixel regions and serving as electrodes for forming an electric field are formed on the lower substrate, and a light shielding layer for preventing light from being leaked, color filter layers for forming colors, and common electrodes serving as electrodes for forming the electric field are formed on the upper substrate.

When the liquid crystal display device is driven in an In Plane Switching (IPS) mode, gate lines and data lines, which perpendicularly intersect with each other, for defining pixel regions, TFTs formed at the intersections of the gate lines and the data lines and serving as switching elements, pixel electrodes and common electrodes formed in the pixel regions and serving as pairs of electrodes for forming a horizontal electric field are formed on the lower substrate, and a light shielding layer for preventing light from being leaked and color filter layers for forming colors are formed on the upper substrate.

Thereafter, a sealant is deposited on one of the lower and upper substrates (20S).

Here, the sealant is deposited on one of the lower and upper substrates so that a sealant layer without an injection port is formed on the substrate, and the deposition of the sealant is performed by one of known methods, such as a printing method and a dispensing method.

Thereafter, liquid crystal is dropped on one of the lower and upper substrates (30S).

The deposition of the sealant (20S) and the dropping of the liquid crystal (30S) may be formed on the same substrate or different substrates.

Thereafter, the lower and upper substrates are bonded to each other (40S).

The bonding of the two substrates is performed, under the condition that the substrate on which the liquid crystal is dropped is located at the lower part and the other substrate is located at the upper part, using a known bonding apparatus.

Thereafter, the sealant is hardened, thus bonding the two substrates to each other (50S).

The hardening of the sealant (50S) may be performed by irradiating only ultraviolet rays or by sequentially irradiating ultraviolet rays and applying heat, according to the kind of the sealant.

The hardening of the sealant (50S) is performed at a temperature of approximately 120° C. The orientation of the liquid crystal layer formed between the lower and upper substrates may be scattered by the hardening of the sealant performed at the above high temperature. Accordingly, the scattered orientation of the liquid crystal layer is returned to its original state through subsequent thermal quenching, which will be described later.

Thereafter, the two bonded substrates are thermally quenched (60S).

The thermal quenching of the substrates (60S) is performed at a temperature of less than a $T_{NI}$ of the liquid crystal within 30 seconds. The $T_{NI}$ of the liquid crystal refers to a clearing point of the liquid crystal, i.e., a temperature at which the transition of the liquid crystal from the mesophase, between the liquid phase and the solid phase, to the liquid phase occurs so that the liquid crystal becomes transparent.

The $T_{NI}$ of the liquid crystal is in the range of approximately 60° C.~90° C.

The above thermal quenching is performed in a designated cooling apparatus. The bonded substrates are placed in the cooling apparatus, and the temperature in the cooling apparatus is quickly lowered to −2° C.~−5° C.

After the hardening of the sealant is completed, the bonded substrates reach a temperature of approximately 120° C., and while the bonded substrates are transferred to the cooling apparatus, the bonded substrates reach a temperature of approximately 110° C., which is lowered by 10° C., and are put into the cooling apparatus. Accordingly, in order to lower the temperature of the liquid crystal from approximately 110° C. to the $T_{NI}$ within 30 seconds, the temperature in the cooling apparatus may be quickly lowered to −2° C.~−5° C.

In order to quickly lower the temperature in the cooling apparatus to −2° C.~−5° C., cold air of a temperature of less than −10° C. is supplied to the cooling apparatus.

When the thermal quenching of the bonded substrates is performed, dew is formed in the cooling apparatus due to a difference of temperatures between the inside of the cooling apparatus and the outside of the cooling apparatus. Accordingly, removal of the dew is additionally performed.

The removal of the dew is performed by applying heat locally to parts of the cooling apparatus in which the dew is formed. Further, in order to locally apply the heat, hot wires are installed at the parts of the cooling apparatus in which the dew is formed.

As described above, the thermal quenching of the bonded substrates (60S) is performed in the cooling apparatus operated in a designated condition. Hereinafter, using the cooling apparatus of an embodiment of the present invention, the thermal quenching of the bonded substrates (60S) and the removal of the dew will be described in more detail.

Figure 3:
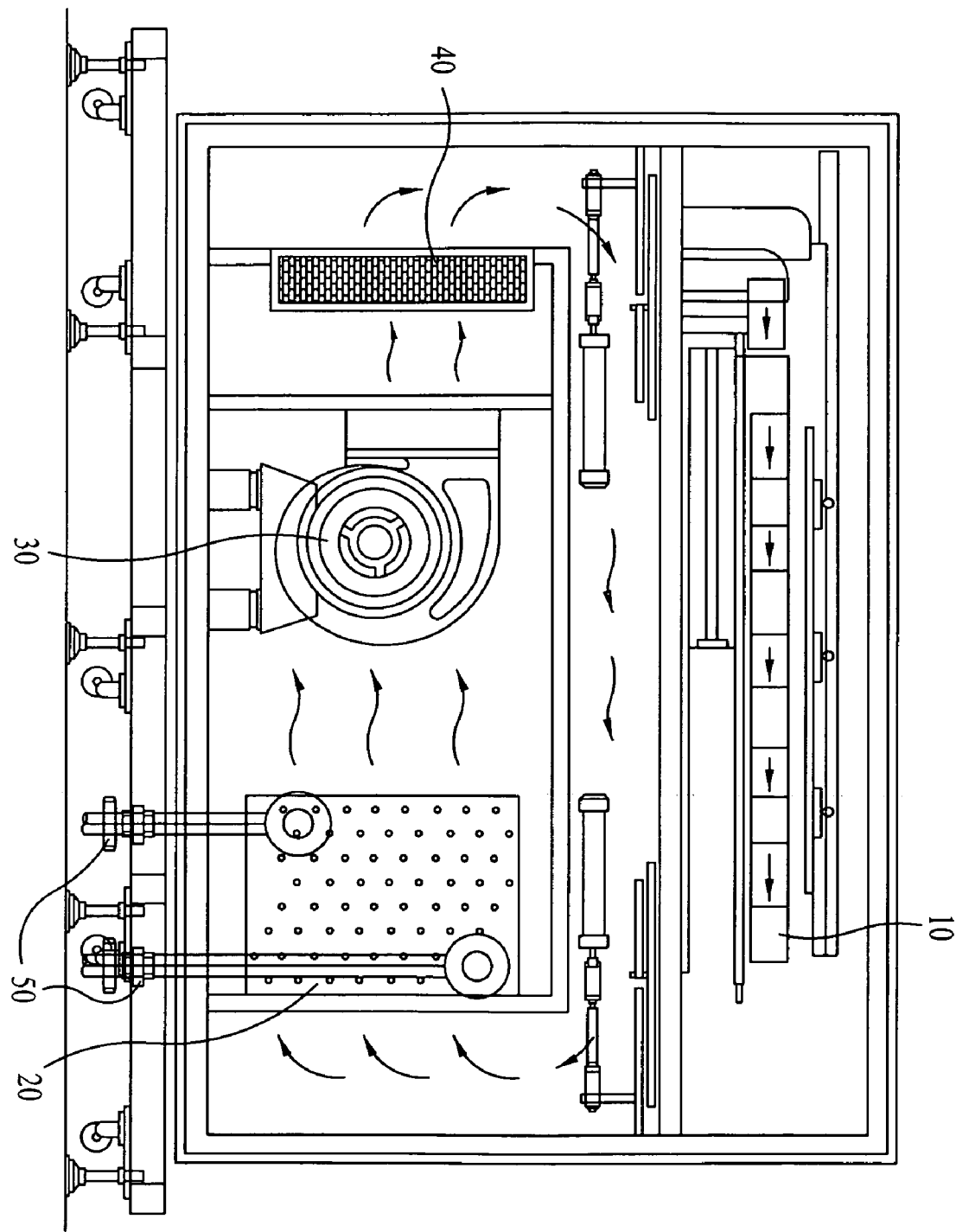
FIG. 3 is a sectional view illustrating the internal structure of a cooling apparatus in accordance with an embodiment of the present invention.
Figure 4A:
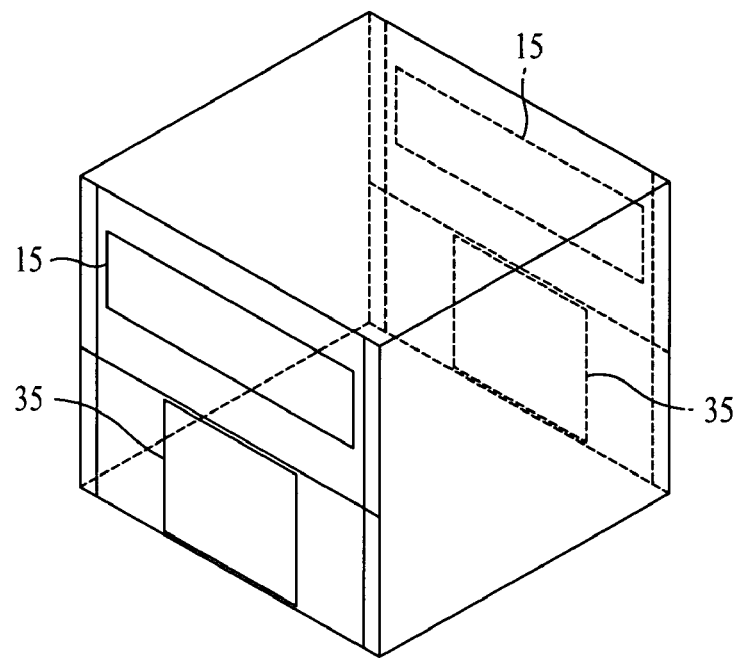
FIGS. 4A and 4B are perspective views illustrating hot wires for removing dew, which are installed in the cooling apparatus.
Figure 4B:
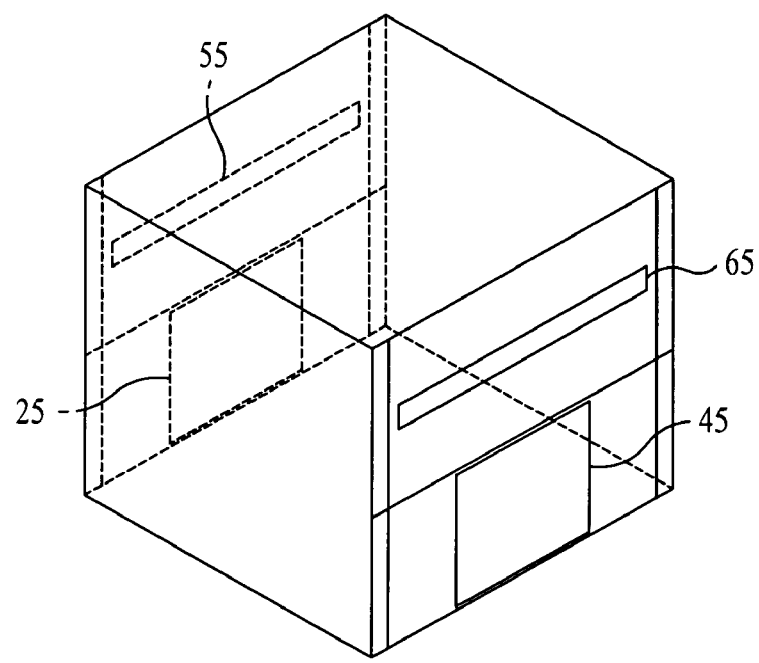

FIG. 3 is a sectional view illustrating the internal structure of a cooling apparatus in accordance with an embodiment of the present invention, and FIGS. 4A and 4B are perspective views illustrating hot wires for removing dew, which are installed in the cooling apparatus.

As illustrated in FIG. 3, the cooling apparatus of an embodiment of the present invention comprises a substrate stage 10, cooling coils 20, a fan 30, and an air filter 40.

The substrate stage 10 serves to mount bonded substrates thereon.

The cooling coils 20 are connected to pipes 50 for supplying air to the cooling apparatus, and serve to cool the air supplied from the pipes 50.

The fan 30 serves to circulate the cold air obtained through the cooling coil 20.

The air filter 40 serves to remove foreign substances from the cold air. Although not illustrated in the drawings, another air filter may be additionally installed above the substrate stage 10.

Now, the thermal quenching of bonded substrates using the above cooling apparatus will be described.

First, when bonded substrates are mounted on the substrate stage 10, the cooling coils 20 cool the air supplied from the pipes 50, thus producing cold air. The cold air is circulated in the direction of arrows through the fan 30, thereby thermal quenching the substrates mounted on the substrate stage 10.

Here, when cold air having a temperature of less than −10° C. is produced by adjusting the condition of the cooling coils 20 and the temperature in the cooling apparatus is set to −2° C.~−5° C. by adjusting the condition of the fan 30, the temperature of the bonded substrates put into the cooling apparatus is lowered from 110° C. to the $T_{NI}$, i.e., approximately 60~90° C., within 30 seconds.

During the thermal quenching, dew may be formed in the cooling apparatus. Accordingly, hot wires for removing the dew are installed at parts of the cooling apparatus in which the dew is formed.

Now, with reference to FIGS. 4A and 4B, the removal of the dew using the hot wires will be described.

As illustrated in FIG. 4A, the hot wires are installed in substrate stage checking doors 15 and fan checking doors 35, which are respectively formed at the front and rear surfaces of the cooling apparatus.

Further, as illustrated in FIG. 4B, the hot wires are installed in a substrate inlet 65 and a cooling coil checking door 45 that are formed through and at the right side surface of the cooling apparatus and in a substrate outlet 55 and an air filter checking door 25, which are formed through and at the left side surface of the cooing apparatus.

Parts of the cooling apparatus in which the dew is formed are the substrate inlet and outlet 65 and 55 and the checking doors 25, 35 and 45. Further, the hot wires may be installed in other parts of the cooling apparatus in which the dew is formed.

As described above, the present invention has several effects, as follows.

First, since thermal quenching of two bonded substrates is performed after hardening of a sealant is performed using a liquid crystal dropping method, the orientation of a liquid crystal layer, which is scattered by the hardening of the sealant, is returned to its original state, thus preventing domain defects.

Second, because hot wires are installed in a cooling apparatus, dew formation is suppressed during the thermal quenching of the two bonded substrates.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a liquid crystal display device comprising:
preparing a lower substrate and an upper substrate;
depositing a sealant on one of the two substrates;
dropping a liquid crystal on one of the two substrates;
bonding the two substrates to each other by hardening the sealant;
thermally quenching the bonded two substrates,
wherein the thermal quenching of the two bonded substrates comprises supplying the two bonded substrates into a cooling apparatus and quickly lowering the temperature in the cooling apparatus to −2~−5° C.,
wherein thermal quenching of the bonded two substrates comprises lowering the temperature of the bonded two substrates to less than a $T_{NI}$ of the liquid crystal within 30 seconds of the hardening of the sealant; and
removing dew generated in the cooling apparatus.

2. The method as set forth in claim 1 wherein the $T_{NI}$ of the liquid crystal is in the range of 60~90° C.

3. The method as set forth in claim 2, wherein quickly lowering of the temperature in the cooling apparatus to −2~−5° C. comprises supplying cold air of a temperature of less than −10° C. to the inside of the cooling apparatus.

4. The method as set forth in claim 1, wherein removing of the dew comprises applying heat locally to parts of the cooling apparatus in which the dew is formed.

5. The method as set forth in claim 4, wherein the local application of the heat is performed using hot wires installed in the parts of the cooling apparatus in which the dew is formed.

6. The method as set forth in claim 5, wherein the hot wires are installed in a substrate inlet, a substrate outlet, or checking doors of the cooling apparatus.

7. The method as set forth in claim 6, wherein the checking doors are at least one selected from the group consisting of a cooling coil checking door, fan checking doors, substrate stage checking doors, and a filter checking door.

8. The method as set forth in claim 1, wherein the hardening of the sealant comprises irradiating ultraviolet rays and applying heat.

* * * * *